US011061159B2

(12) United States Patent
Tshering et al.

(10) Patent No.: US 11,061,159 B2
(45) Date of Patent: Jul. 13, 2021

(54) ELECTROMAGNETIC RESPONSE DATA INVERSION USING SINGULAR VALUE DECOMPOSITION

(71) Applicant: PGS Geophysical AS, Oslo (NO)

(72) Inventors: Tashi Tshering, Oslo (NO); Maiza Bekara, Weybridge (GB); Allan McKay, Oslo (NO); Eivind Rödnes Vesterås, Oslo (NO)

(73) Assignee: PGS GEOPHYSICAL AS, Oslo (NO)

( * ) Notice: Subject to any disclaimer, the term of this patent is extended or adjusted under 35 U.S.C. 154(b) by 261 days.

(21) Appl. No.: 16/164,881

(22) Filed: Oct. 19, 2018

(65) Prior Publication Data

US 2019/0120991 A1 Apr. 25, 2019

Related U.S. Application Data

(60) Provisional application No. 62/574,918, filed on Oct. 20, 2017.

(51) Int. Cl.
*G01V 3/08* (2006.01)

(52) U.S. Cl.
CPC ........ *G01V 3/083* (2013.01); *G01V 2003/086* (2013.01)

(58) Field of Classification Search
CPC ................. G01V 2003/086; G01V 3/083
See application file for complete search history.

(56) References Cited

U.S. PATENT DOCUMENTS

| 7,248,370 | B2 | 7/2007 | Jones |
| 9,619,590 | B2 | 4/2017 | Tompkins et al. |
| 9,746,577 | B2 | 8/2017 | Ciucivara et al. |
| 2009/0006053 | A1* | 1/2009 | Carazzone ............... G01V 3/12 703/5 |
| 2017/0108604 | A1 | 4/2017 | Turquais et al. |
| 2017/0160414 | A1 | 6/2017 | Sternfels |
| 2018/0259664 | A1 | 9/2018 | Li et al. |

OTHER PUBLICATIONS

Julianne Chung, Matthias Chung, Dianne P. O'Leary; "Optimal regularized low rank inverse approximation"; Linear Algebra and its Applications, published Aug. 5, 2014 (Year: 2014).*

* cited by examiner

*Primary Examiner* — Roy Y Yi
*Assistant Examiner* — Geoffrey T Evans

(57) ABSTRACT

Inversion of enhanced-sensitivity controlled source electromagnetic data can include approximating a background response from measured controlled source electromagnetic (CSEM) response data. The approximation can include performing a first inversion of the CSEM response data using a largest singular value in a diagonal of a matrix associated with the CSEM response data to create a first resistivity model of a subsurface of a subterranean formation and iteratively performing subsequent inversions while increasing an amount of singular values in the diagonal to obtain modeled CSEM response data to create a second resistivity model of the subsurface of the subterranean formation. Inversion of enhanced-sensitivity controlled source electromagnetic data can further include storing results of the first inversion and the iterative subsequent inversions producing a resistivity map based on the first and the second resistivity models.

21 Claims, 6 Drawing Sheets

ELECTROMAGNETIC RESPONSE DATA INVERSION USING SINGULAR VALUE DECOMPOSITION

CROSS-REFERENCE TO RELATED APPLICATIONS

This application claims priority to U.S. Provisional Application 62/574,918, filed Oct. 20, 2017, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more marine survey sources below the sea surface and over a subterranean formation to be surveyed for mineral or hydrocarbon deposits. Marine survey receivers may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more marine survey sources, which can be seismic sources such as air guns or marine vibrator sources. A marine survey source can be an electromagnetic source that injects current into the water. For seismic sources, each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the sea surface. The marine survey receivers thereby measure a wavefield that was initiated by the actuation of the marine seismic source. For electromagnetic (EM) sources, the electric current injected into the water travels into the subsurface according to diffusion physics that govern the Controlled Source ElectroMagnetic (CSEM) method. The resulting EM field in the water is measured by the receivers. The resulting EM field can be indicative of mineral or hydrocarbon deposits.

DETAILED DESCRIPTION

Figure 1:
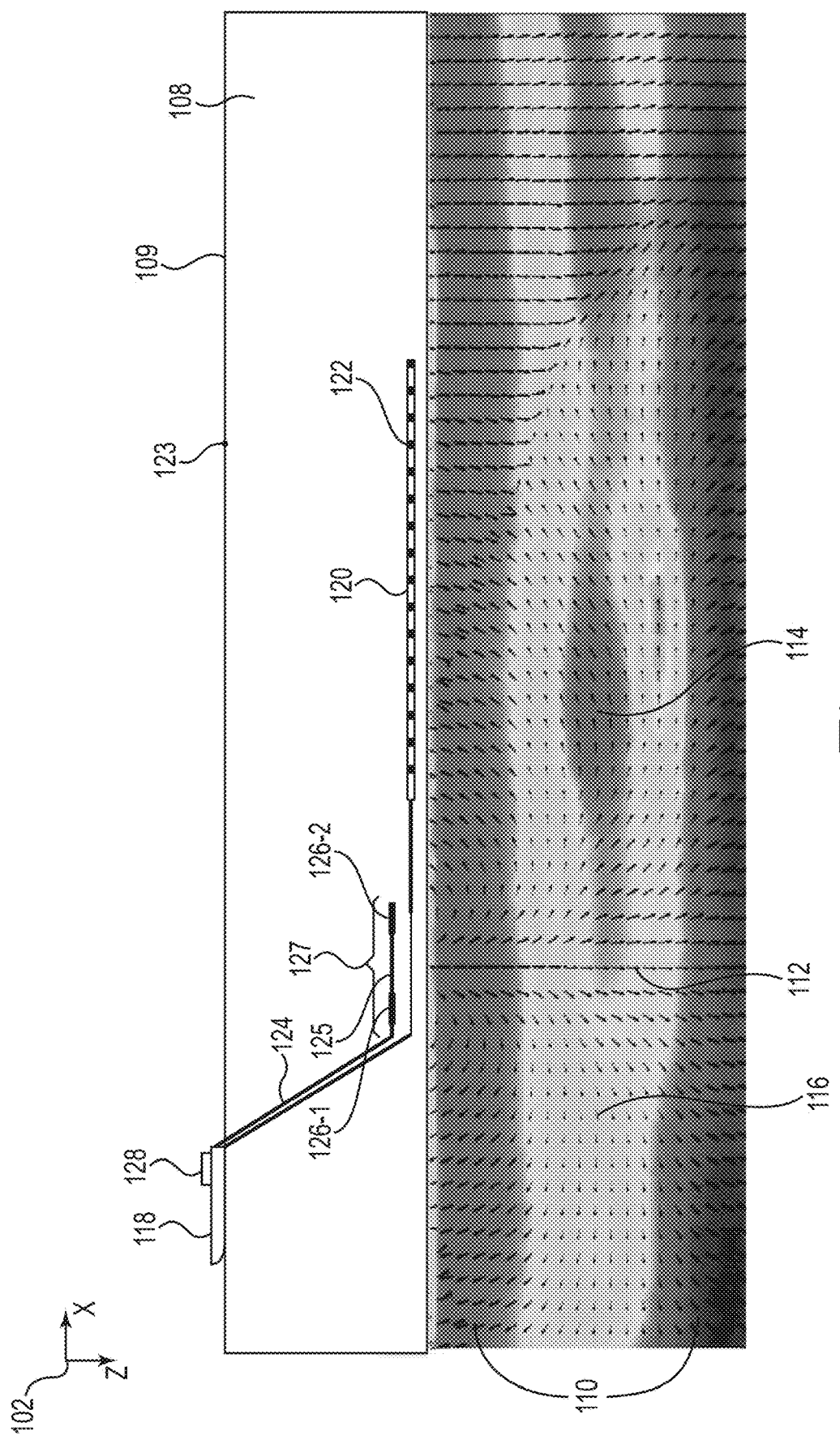
FIG. 1 illustrates an xz-plane view of controlled source electromagnetic (CSEM) surveying in which an electric current is injected into a water volume by a CSEM source.

This disclosure is related generally to the field of marine surveying. Marine surveying can include, for example, seismic surveying or EM surveying such as CSEM surveying, among others. EM response data inversion includes the process of transforming EM response data into a quantitative property description of a reservoir, such as a subterranean formation, rock property description, or seafloor resistivity. EM response data, as used herein, is data acquired during an EM survey. CSEM response data, as used herein, is data acquired during a CSEM survey. At least one embodiment of the present disclosure has applications in CSEM surveying. A CSEM survey includes the use of EM remote-sensing technology to indicate the presence and extent of hydrocarbon below a seafloor. A CSEM survey employs a source towed above the seafloor to transmit a time-varying EM field into the earth. The time-varying EM field is modified by the presence of subsurface resistive layers, and the modifications are detected at a marine EM receiver.

In CSEM surveying, one or more CSEM sources may be towed and are used to inject an electric current into a water volume. In at least one embodiment, EM receivers may be towed concurrently with the CSEM source. The EM receivers are electrode pairs that measure the potential difference between the electrodes within each pair thereby collecting marine CSEM response data, which can vary and be dependent on the subsurface electrical resistivity formation. CSEM can be inverted to generate images of the subsurface resistivity formation. High resistivity may be an indication of hydrocarbon if the structure shows a potential reservoir formation. In particular, the present disclosure is related to inversion of CSEM response data including approximating a background response from measured CSEM response data. The background response can be a background response of a subsurface and can be the background response of the modeled CSEM response data or the measured CSEM response data. The background response can be modeled CSEM response data at a location where the subsurface resistivity is considered as background. For example, the subsurface resistivity that is considered as background can be the subsurface resistivity that is indicative of the subsurface in general, such as where there are no hydrocarbons. The background response can be measured CSEM response data at a location other than the location of the subsurface resistivity variation.

A total CSEM response, either measured or modeled, is the sum of the background response plus an anomalous response (if present). When no anomaly is present, such as in hydrocarbon reservoirs, the total CSEM response may be the same as the background response. In the presence of an anomaly, the background response is extracted from the total CSEM response (measured or modeled) using at least one embodiment of the present disclosure, as described herein. Though examples herein describe the use of CSEM response data, other EM response data may be used.

A background response approximation illustrates anomalies of interest during interpretation, and the background response can be inverted to build a representative, data-driven, resistivity start model. In at least one embodiment, the inversion can be continued in increments with increasing complexity. For instance, singular values associated with the measured CSEM response data can be increasing. Thus, the results of the inversion can be improved at a very small or even negligible computational cost.

Some previous inversion approaches for inversion of CSEM or other EM response data are based on entire matrices of measured EM response data. For instance, an inversion is run on an entire matrix. Such approaches may result in unstable inversions or computationally complex inversions. At least one embodiment of the present disclosure can include performing an inversion that first considers a background response associated with CSEM response data by inverting CSEM response data having a largest singular value and increasing inversion complexity from there. For instance, rather than run an entire EM response data set at once, at least one embodiment of the present disclosure breaks down CSEM response data based on singular values. Such an example can result in an approximation of a background response and can be attributed to a smoothest representation of the subsurface. By first obtaining this approximation and then increasing inversion complexity, the inversion process is simpler, and inversion stability improves, which can improve the success of CSEM surveys. This can result in improved resistivity models as compared to approaches with more complex, unstable inversion processes.

Non-EM inversion or decomposition approaches use different frequencies such that lower frequencies may be used to estimate a background response. This type of approach is based on frequency bands and may include a large plurality of frequency values obtained to reach a desired result. In contrast to the present disclosure, such approaches do not use SVD for decomposition. Using SVD can allow for desired data to be captured in fewer values than approaches using frequency values. For instance, desired data can be captured in 7 or fewer values.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 illustrates an xz-plane 102 view of CSEM surveying in which an electric current is injected into a water volume 108 by CSEM source 127. The CSEM source 127 can include a forward electrode 126-1 coupled to an aft electrode 126-2 via an interconnect cable 125. The forward electrode 126-1 can assume a relatively fixed layback (depth and distance) with respect to the marine survey vessel 118 and the aft electrode 126-2 can be maintained at a relatively fixed distance behind the forward electrode 126-1 because of drag forces from being towed. The forward electrode 126-1 can be coupled to the marine survey vessel 118 via a cable 124. The depth of the forward electrode 126-1 can be set by a deployed length of the cable 124. The interconnect cable 125 can cause changes in the depth or lateral position of the forward electrode 126-1 to be transmitted to the aft electrode 126-2. The CSEM source 127 can include one or more CSEM sources. For example, the forward electrode 126-1 and the aft electrode 126-2 can be a CSEM source, such as a dipole source. Because the forward electrode 126-1 and the aft electrode 126-2 can be maintained at a relatively fixed distance apart, the forward electrode 126-1 and the aft electrode 126-2 can be a horizontal dipole source.

FIG. 1 shows an example of a marine survey vessel 118 equipped to carry out CSEM surveys. Although not specifically illustrated, the marine survey vessel 118 can be configured to perform both CSEM surveys and marine seismic surveys. The marine survey vessel 118 can tow one or more streamers 120 (shown as one streamer for ease of illustration) below the water surface 109. The streamers 120 can be long cables containing power and data-transmission lines, such as electrical, optical fiber, etc., to which EM receivers 122 may be coupled. In a CSEM survey, the streamers 120 can make use of EM receivers 122, which detect changes in EM energy within the water volume 108. In marine seismic surveys, the streamers 120 can make use of seismic receivers that include a motion sensor, such as a geophone sensor, that detects particle displacement within the water volume 108 by detecting particle motion variation, such as velocities or accelerations, and a hydrophone that detects variations in pressure. In another type of marine survey, such as three-dimensional (3D) seismic EM surveys, receivers on one or more streamers 120 can include EM receivers and seismic receivers such that the streamers 120 can be used to detect both changes in EM energy and seismic energy.

The marine survey vessel 118 can tow marine seismic survey equipment concurrently with the CSEM source 127. The marine seismic survey equipment can include, but is not limited to, seismic sources and streamers, such as the streamer 120. A seismic source can emit an expanding, spherical acoustic signal, which can be analogized to semi-circles of increasing radius centered at the seismic source, representing a down-going wavefield, following an acoustic signal emitted by the seismic source. The outward and downward expanding down-going wavefield may eventually reach a solid surface, such as the seafloor, at which point the outward and downward expanding down-going wavefield may partially scatter, may partially reflect back toward the streamer, and may partially refract downward into a solid volume, such as the subsurface, becoming elastic acoustic signals within the solid volume. In contrast, an EM signal is diffusive in nature. The EM field is described by the diffusion limit of Maxwell's equations.

CSEM sources 127 and/or streamers 120 may also be towed by other vessels or may be otherwise disposed in water volume 108. For example, EM receivers may be located on ocean bottom cables or nodes fixed at or near the water bottom, and CSEM sources 127 may also be disposed in a nearly-fixed or fixed configuration. For the sake of efficiency, illustrations and descriptions herein show EM receivers 122 located on streamers 120, but it should be understood that references to EM receivers located on a "streamer" or "cable" should be read to refer equally to marine survey receivers located on a towed streamer, an ocean bottom receiver cable, and/or an array of nodes.

The streamers 120 and the marine survey vessel 118 can include sensing electronics and data-processing facilities that allow receiver readings to be correlated with absolute positions on the sea surface and absolute 3D positions with respect to a 3D coordinate system. In FIG. 1, the EM receivers 122 along the streamer 120 are shown to lie below the sea surface 109, with the receiver positions correlated with overlying surface positions, such as a position 123 near the water surface 109 correlated with the position of receiver 122. Although not specifically illustrated, for some surveys, the streamers 120 can be towed by one vessel, such as the marine survey vessel 118, and the CSEM source 127 can be towed by a different vessel.

A controller 128 can be onboard the marine survey vessel 118. The controller 128 can be coupled to the CSEM source 127. The controller 128 can include processing resources and memory resources and be configured to operate the CSEM source 127. The controller 128 can be coupled to the streamer 120. The controller 128 can be configured to receive data from the EM receivers 122 associated with the streamer 120. In at least one embodiment, the controller 128 can be configured to perform an inversion of CSEM response data as described in more detail herein. For example, processing and analysis of CSEM response data from injecting the electric current can be performed in order to help characterize the resistivity structures and distributions of features and materials underlying the surface of the earth. Geological models, such as resistivity models of a subsurface, can be used to model the EM fields resulting from the current injected from the CSEM source 127 above the subsurface that does or does not contain hydrocarbons. By comparing CSEM response data from a CSEM survey using the CSEM source 127 to the geological models, a likelihood of hydrocarbons being located in the surveyed subsurface can be determined.

The CSEM 127 can be used with various frequencies (for example, from 0.1 hertz (Hz) to 100 Hz) of switched DC power. Low frequencies can promote penetration of an EM field resulting from the electric current into the water volume 108; however, the resolution of the CSEM response data may be low. In contrast, high frequencies can yield high resolution CSEM response data, but the EM field may not penetrate the subsurface as much as the low frequencies. It is beneficial to use a wide frequency band to get a combination of deep penetration into the subsurface and good resolution of the CSEM response data.

FIG. 1 shows energy flux 112 and 116 (displayed as arrows) resulting from the electric current injected by the CSEM source 127 and a subsurface resistivity profile 110 from an inversion (indicated by the shading). A change in the resistivity profile may indicate a change in the geology of the subsurface. For example, the darker shading 114 surrounded by lighter shading may be indicative of hydrocarbons in the subsurface. Inversion means reversing a known physical relation in order to infer physical properties from measured data. For example, an inversion compares modeled data to measured data and iteratively minimizes the difference therebetween. In the case of CSEM surveys, it is the subsurface resistivities that are inverted for using CSEM response data received at different positions and offsets from the CSEM source 127. The subsurface resistivity cannot be directly measured using this technique, which is why an inversion is used. To accurately identify anomalies, which include variations, in the subsurface resistivity (possibly indicating a hydrocarbon saturated volume), a characterization of a background response in the CSEM response data must be sufficient to facilitate detection of an EM response. In at least one embodiment of the present disclosure, the background response is removed from the received or measured CSEM response data to show anomalies of interest, and the background response is inverted to build a representative, data-driven resistivity start model. In at least one embodiment, the resistivity start model is built using prior knowledge of an area to be studied such as information associated with extrapolation from nearby well data or other older geophysical data. The resistivity start model is representative such that it is within a threshold similarity to a potential final result. For instance, the resistivity start model is close enough to a final resistivity model that a convergence at a solution is made. Put another way, if the resistivity start model is not representative, meaning it is too far away from a final resistivity model, a subsequent inversion process may not reach a solution; that is, the resistivity start model and the final resistivity model may not converge and may be "stuck in local minima." The resistivity start model is data-driven such that the background response is decomposed from a total response, and inversion of the background response may result in a background response model that can be used as the resistivity start model.

The inversion is continued in increments with increasing complexity of singular values associated therewith. Singular values are values of a compact operator $T: X \rightarrow Y$ acting between Hilbert spaces X and Y, and are the square roots of the eigenvalues of the non-negative self-adjoint operator $T^*T: X \rightarrow X$ (where $T^*$ denotes the adjoint of T). The singular values are non-negative real numbers, usually listed in decreasing order $(s_1(T), s_2(T), \ldots )$. The largest singular value $s_1(T)$ is equal to the operator norm of T.

Figure 2:
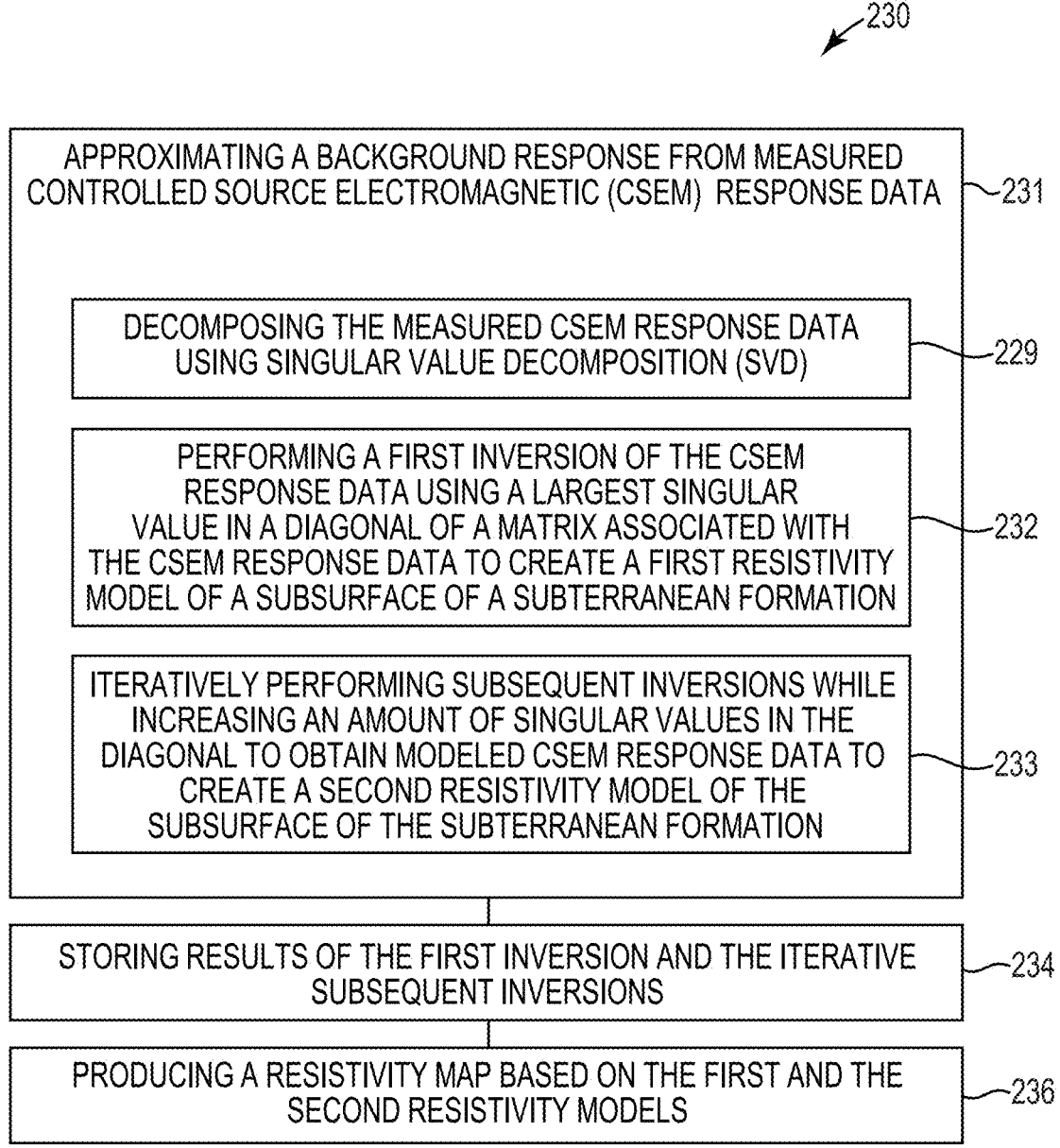
FIG. 2 illustrates an exemplary method flow diagram for electromagnetic (EM) response data inversion using singular value decomposition (SVD).

FIG. 2 illustrates an exemplary method flow diagram 230 for EM response data inversion using SVD. The EM response data is CSEM response data in at least one embodiment. At block 231, the method can include approximating a background response from measured CSEM response data. The approximation can include, at block 229, decomposing the measured CSEM response data using SVD. SVD is a factorization of a real or complex matrix. It is the generalization of the eigendecomposition of a positive semidefinite normal matrix such as a symmetric matrix with positive eigenvalues to an m×n matrix via an extension of the polar decomposition. For instance, a data matrix A of size m×n can be expressed as:

$$A = U \Sigma V^*$$

where $\Sigma$ is an m×n diagonal matrix with singular values $\sigma$ in the diagonal, U is an m×m matrix with "left" singular vectors u corresponding to $\sigma$ as columns, and V is an n×n matrix with "right" singular vectors v corresponding to $\sigma$ as columns. The "*" indicates a complex conjugate. Put another way, the data matrix A is decomposed into U, $\Sigma$, and V. $\Sigma$ has values in the diagonal. These values are the singular values. By taking only the higher order singular values, or "trunks" in $\Sigma$, a truncated SVD can be expressed or approximated as:

$$\tilde{A} = U \tilde{\Sigma} V^*$$

where $\tilde{\Sigma}$ has the same size as $\Sigma$, but only includes the q largest diagonal elements, while the remaining diagonal elements are set to zero. A diagonal element, as used herein, is an element, such as a numerical value, within the diagonal of the matrix. A numerical value can include an actual value of an element or a singular value, among others. The matrix A is assumed to be EM frequency response data, which is actuations×frequencies×offsets. Some approaches to EM or CSEM inversion preserve a plurality of largest singular values of actuations×frequencies matrices in $\tilde{\Sigma}$ and the remaining diagonal elements are set to zero for noise reduction. The elements are considered the "largest" singular value based on matrix transformation. The largest singular values have the largest eigenvalues, which may or may not be related to an actual value of the data. An inversion is then performed on the entire matrix in such approaches.

In contrast, at least one embodiment of the present disclosure uses a single largest singular value in the diagonal and sets the remaining diagonal elements to zero in Σ, such that the matrix Ã is an approximation of the background EM response and can be attributed to the smoothest representation of the subsurface. Incremental inversions are then performed.

For instance, the approximation can include, at block 232, performing a first inversion of the CSEM response data using a largest singular value in a diagonal of a matrix associated with the CSEM response data to create a first resistivity model of a subsurface of a subterranean formation. The diagonal of the matrix can include elements that form the main diagonal of a square matrix. They lie on the imaginary line that runs from the top left corner to the bottom right corner of the matrix. The resistivity model may be similar to having 3D coverage of resistivity logs. The resistivity model can include different resistivity zones, such that high resistivity zones can be associated with high hydrocarbon saturation, whereas a background area with brine-saturated zones show lower resistivity. The resistivity model can be used to model EM fields resulting from a current injected from a CSEM source above the subsurface that does or does not contain hydrocarbons.

The largest singular value represents a smoothest portion of the CSEM response data, which also represents a background response associated with the CSEM response data. It is the smoothest portion such that the least amount of noise or other unwanted phenomena is present as compared to other portions of the CSEM response data. Diagonal elements of the first inversion that are not the largest singular value are set to zero.

For instance, an example matrix includes Σ having a plurality of singular values, 1 through n, where all noise is removed if more than seven singular values are removed. In an example in which singular values 2-7 are removed where singular values 2-7 are associated with target responses and singular value 1 is the largest singular value, an estimate of the background response can be made. A background response, in at least one embodiment, includes a variation in a sedimentary subsurface. Variation can include changes or differences in a condition of the sedimentary subsurface. In such an example, the Σ matrix is truncated to reconstruct or approximate the matrix A. By considering only the largest singular value, the matrix A can approximate the background response. If singular values 2-7 are kept, intermediate features are introduced that are not as large as the background response features and with greater variability as noise in the CSEM response data. In at least one embodiment, singular values 7 and above are set to zero and discarded as noise. While singular values 1-7 are used in this example, the number and values of singular values can vary depending on the CSEM response data. In at least one embodiment, the number and values of singular values are determined and fine-tuned during processing of the CSEM response data.

In at least one embodiment, the first inversion of the CSEM response data exposes an anomaly in the subsurface. As used herein, an anomaly includes a localized region of higher resistivity. An anomaly may be indicative of hydrocarbon presence. Put another way, an anomaly is a thin resistor that can identify hydrocarbon-filled traps. Detection of anomalies may be a goal of CSEM surveying. A difference between the first resistivity model and the second resistivity model highlights the resistivity anomalies in the subsurface, which may be indicative of hydrocarbons.

At block 234, the approximation can further include iteratively performing subsequent inversions while increasing an amount of singular values in the diagonal to obtain modeled CSEM response data to create a second resistivity model of the subsurface of the subterranean formation. The subsequent inversions are performed while increasing an amount of singular values having increasing complexities in the diagonal to obtain the modeled CSEM response data. The singular values are discrete singular values in at least one embodiment such that they can only take on particular values such as 0, 1, 2, 3, etc. Complexities may be increased until a threshold amount of detail is present in the second resistivity model or until a threshold number of singular values have been used. A threshold amount of detail includes an amount of detail determined or predetermined to result in a desired resistivity model. A threshold number of singular values includes a number of singular values determined or predetermined to give a desired model with a desired efficiency. For instance, it may be determined that 7 singular values give a desired amount of complexity without being overkill. While 7 is used herein, different numbers of singular values may be determined as a threshold number.

The contribution from the subsequent singular values increases the complexity in the resulting CSEM response data. The complexity increase, as used herein, includes an increase in frequency and wavenumber content. Higher order effects can be a result of other, more localized resistive anomalies in the subsurface. For instance, as described previously herein, in an example using singular values 1-7, by considering only the largest singular value of 1, the matrix A can approximate the background response. If singular values 2-7 are kept, intermediate features are introduced such as intermediate scale anomalies, hydrocarbon accumulations, or other resistive bodies of similar size that are not as large as the background response features and having greater variability as noise in the CSEM response data. Singular values 7 and above are set to zero and discarded as noise.

At block 234, the method can include storing results of the first inversion and the iterative subsequent inversions. For instance, the results can be stored in a data store or other memory resource such as a non-transitory machine-readable medium. In at least one embodiment, the results can be stored onshore or offshore.

At block 236, the method can include producing a resistivity map based on the first and the second resistivity models. For instance, the produced resistivity map may be used for determining the presence of hydrocarbons in a location associated with the resistivity map. In at least one embodiment, expected hydrocarbon locations can be determined based on the resistivity map, the updated resistivity model, or both. The resistivity map can include a plurality of potential locations containing hydrocarbons based on resistivity as compared to a resistivity model which includes different resistivities used to create EM models.

In at least one embodiment, the method 230 described with respect to FIG. 2 includes a process for CSEM response data inversion, wherein the method 230 is a specific improvement consisting of one or more of elements 231, 229, 232, 233, 234, and 236. In at least one embodiment, the specific improvement includes approximating a background response from measured CSEM response data and inverting the background response first using a largest singular value and then increments of increasing singular values to improve performance of a computing device, including reducing computation times and memory requirements because of reduced complexity of an inversion process.

In accordance with at least one embodiment of the present disclosure, a geophysical data product may be produced or manufactured. Geophysical data may be obtained and stored on a non-transitory, tangible machine-readable medium. The geophysical data product may be produced by processing the geophysical data offshore or onshore either within the United States or in another country. If the geophysical data product is produced offshore or in another country, it may be imported onshore to a facility in the United States. Processing the geophysical data includes approximating a background response from measured CSEM response data. The approximation includes performing a first inversion of the CSEM response data using a largest singular value in a diagonal of a matrix associated with the CSEM response data to create a first resistivity model of a subsurface of a subterranean formation and iteratively performing subsequent inversions while increasing an amount of singular values in the diagonal to obtain modeled CSEM response data to create a second resistivity model of the subsurface of the subterranean formation. Processing the geophysical data further includes storing results of the first inversion and iterative subsequent inversions and producing a resistivity map based on the first and the second resistivity models.

In at least one embodiment, geophysical data is processed to generate an EM or CSEM image, and the EM or CSEM image on one or more non-transitory computer readable media, thereby creating the geophysical data product. In some instances, once onshore in the United States, geophysical analysis may be performed on the geophysical data product. In some instances, geophysical analysis may be performed on the geophysical data product offshore.

Figure 3:
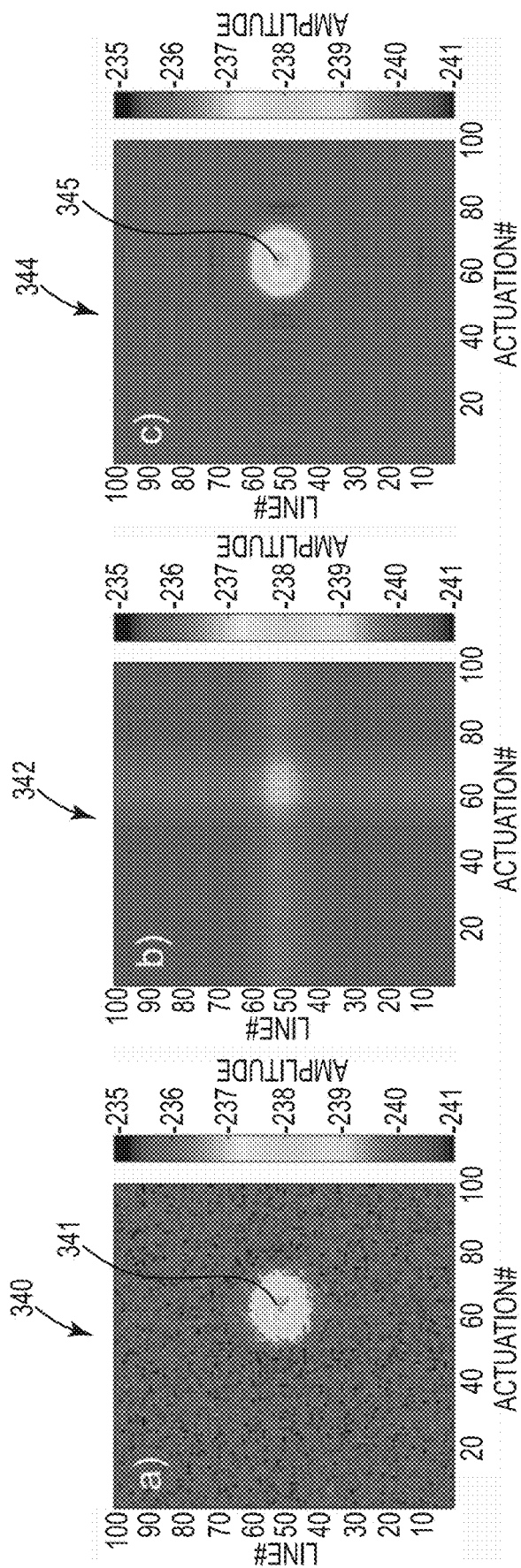
FIG. 3A illustrates an exemplary amplitude map of CSEM response data.
FIG. 3B illustrates another exemplary amplitude map of CSEM response data.
FIG. 3C illustrates yet another exemplary amplitude map of CSEM response data.

FIG. 3A illustrates an exemplary amplitude map 340 of CSEM response data. For instance, amplitude map 340 is based on a 0.1 Hz and 5.5 kilometer (km) offset of a 3D survey configuration. Amplitude map 340 is a mapped representation of FIG. 6A, which will be discussed further herein. Amplitude map 340 illustrates a 3D response perturbed with 3 percent Gaussian noise. A main anomaly 341 from a target of a CSEM survey is visible near line number 50 and actuation number 60. The information illustrated in FIG. 3A can be considered measured CSEM data.

FIG. 3B illustrates another exemplary amplitude map 342 of CSEM response data. Like amplitude map 340, amplitude map 342 is based on a 0.1 Hz and 5.5 km offset of a 3D survey configuration. Amplitude map 342 is a truncated SVD version of amplitude map 340 using a largest singular value approximated as the background response, for instance, $q=1$. In the example illustrated in FIG. 3B, anomaly 341 is removed by performing truncated SVD, resulting in a response similar to the background response. The information illustrated in FIG. 3B can be considered background response data.

FIG. 3C illustrates yet another exemplary amplitude map 344 of CSEM response data. Like amplitude maps 340 and 342, amplitude map 344 is based on a 0.1 Hz and 5.5 km offset of a 3D survey configuration. Amplitude map 344 includes results subsequent to the consideration of a second singular value, for instance, $q=2$. Put another way, amplitude map 342 is a truncated SVD version of amplitude map 340 using a first and a second largest singular value. By including the first and the second largest singular values, anomaly 345 (which may be the same as anomaly 341 in at least one embodiment) is recovered, while noise is suppressed. Put another way, amplitude map 344 illustrates the inclusion of singular values other than the largest singular value and the deconstruction of the anomaly 345, but without noise. The information illustrated in FIG. 3C can be used for removal of noise in at least one embodiment.

Figure 4:
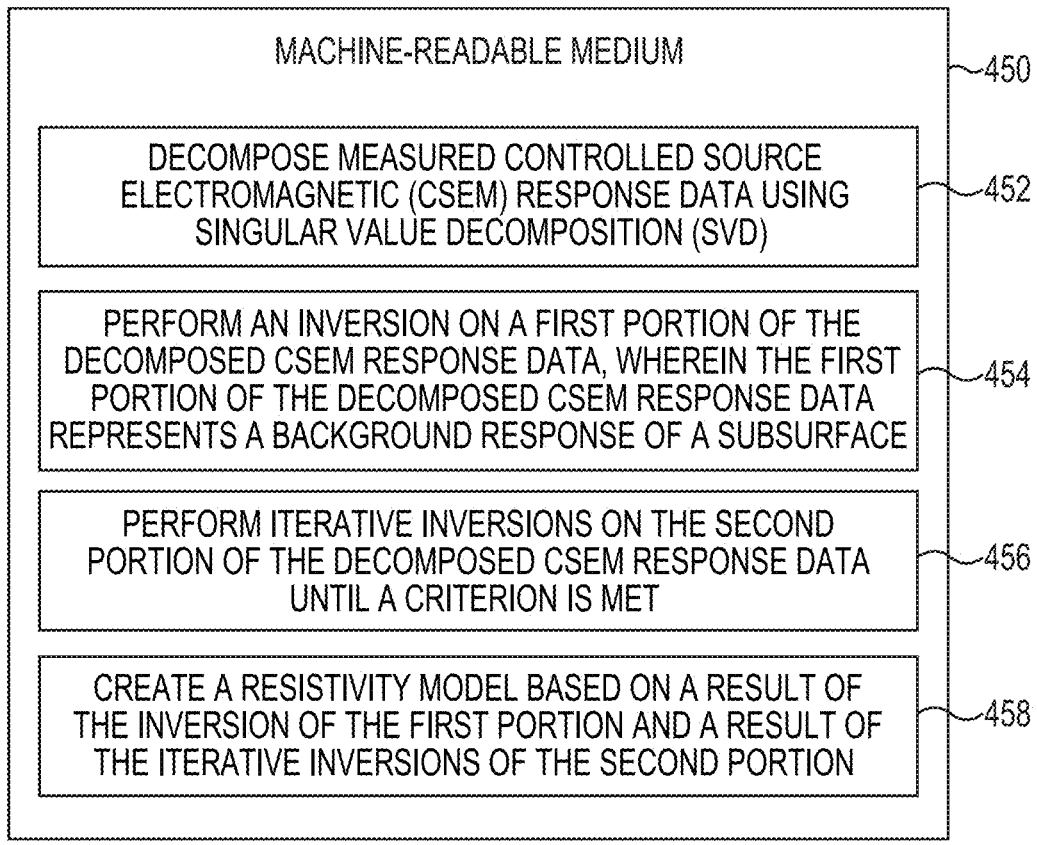
FIG. 4 illustrates a diagram of an exemplary machine-readable medium for EM response data inversion using SVD.

FIG. 4 illustrates a diagram of an exemplary machine-readable medium for EM response data inversion using SVD. The machine readable medium 450 can be non-transitory. The machine readable medium 450 can, in at least one embodiment, be analogous to the memory resource 562 illustrated in FIG. 5. The machine readable medium 450 can store instructions executable by a processing resource. For example, at 452, the machine readable medium 450 can store instructions executable to decompose measured CSEM response data using SVD. The SVD, in some examples, is truncated SVD. For instance, truncated SVD can be used to decompose CSEM response data including frequency responses into different components with varying spatial resolution via CSEM inversion. The spatial resolution varies because the spatial variation depends on the number of singular values preserved in the truncated SVD. For instance, a singular value of 1 represents a lowest spatial resolution, and the inclusion of higher singular values increases the spatial resolution in the CSEM response data. At 454, the machine readable medium 450 can store instructions executable to perform an inversion on a first portion of the decomposed CSEM response data, wherein the first portion of the decomposed CSEM response data represents a background response. For instance, the first portion of the decomposed CSEM response data may be data having a largest singular eigenvalue representing the background response. The background response, in at least one embodiment, is based on a matrix of size m×n having a first diagonal element set to a first numerical value and remaining diagonal elements set to zero. Values of a second portion of the decomposed CSEM response data are set to zero during the decomposition. The background response comprises a variation in a sedimentary portion of the subsurface in at least on embodiment.

For instance, in at least one embodiment, the background response can be approximated based on an m×m matrix with a first set of singular vectors corresponding to a set of singular values as columns, an m×n diagonal matrix with the largest singular value of the set of singular values in the diagonal, and an n×n matrix with a second set of singular vectors corresponding to the set of singular values as columns. The approximation can be based on the m×n diagonal matrix with the largest singular value of the set of singular values in the diagonal and remaining elements in the diagonal set to zero.

The inversion can be run with $q=1$ meaning only the largest singular value is considered. In at least one embodiment, this is the smoothest portion of the CSEM response data, and the inversion is simpler as compared to other inversion approaches because it begins with a homogenous half-space model. For instance, some approaches perform an inversion of CSEM response data in a single step starting from a homogeneous isotropic subsurface model. In contrast, at least one embodiment of the present disclosure uses the largest singular value to obtain a background response and performs further inversions including subsequent singular values, using the background response as a resistivity start model.

For instance, at 456, the machine readable medium 450 can store instructions executable to perform iterative inversions on the second portion of the decomposed CSEM response data until a criterion is met. Criterion, as used herein, includes reaching a desired threshold, for instance, a threshold number of singular values or a resistivity model having a threshold amount of detail. Using the outcome of the previous inversion, higher singular values are included to increase the complexity of an associated resistivity model. For instance, in at least one embodiment, the inversions have increasing complexities as the singular values increase. The inversion can be divided into increments of resistivity model updates with increasing complexity (increasing singular values). The inversions can be more robust and efficient as compared to other approaches that perform a single inversion, as the complexity of the subsurface is gradually increased. At 458, the machine readable medium 450 can store instructions executable to create a resistivity model based on a result of the inversion of the first portion and a result of the iterative inversion of the second portion. The resistivity model can include different resistivity zones, as discussed previously herein.

Although not specifically illustrated, the machine readable medium 450 can store instructions executable to create a CSEM image indicative of the subterranean formation based on a result of the inversion of the first portion and a result of the iterative inversion of the second portion. Such an image can be useful to prospectors seeking to extract hydrocarbons that may be associated with the subsurface resistivity variation.

Figure 5:
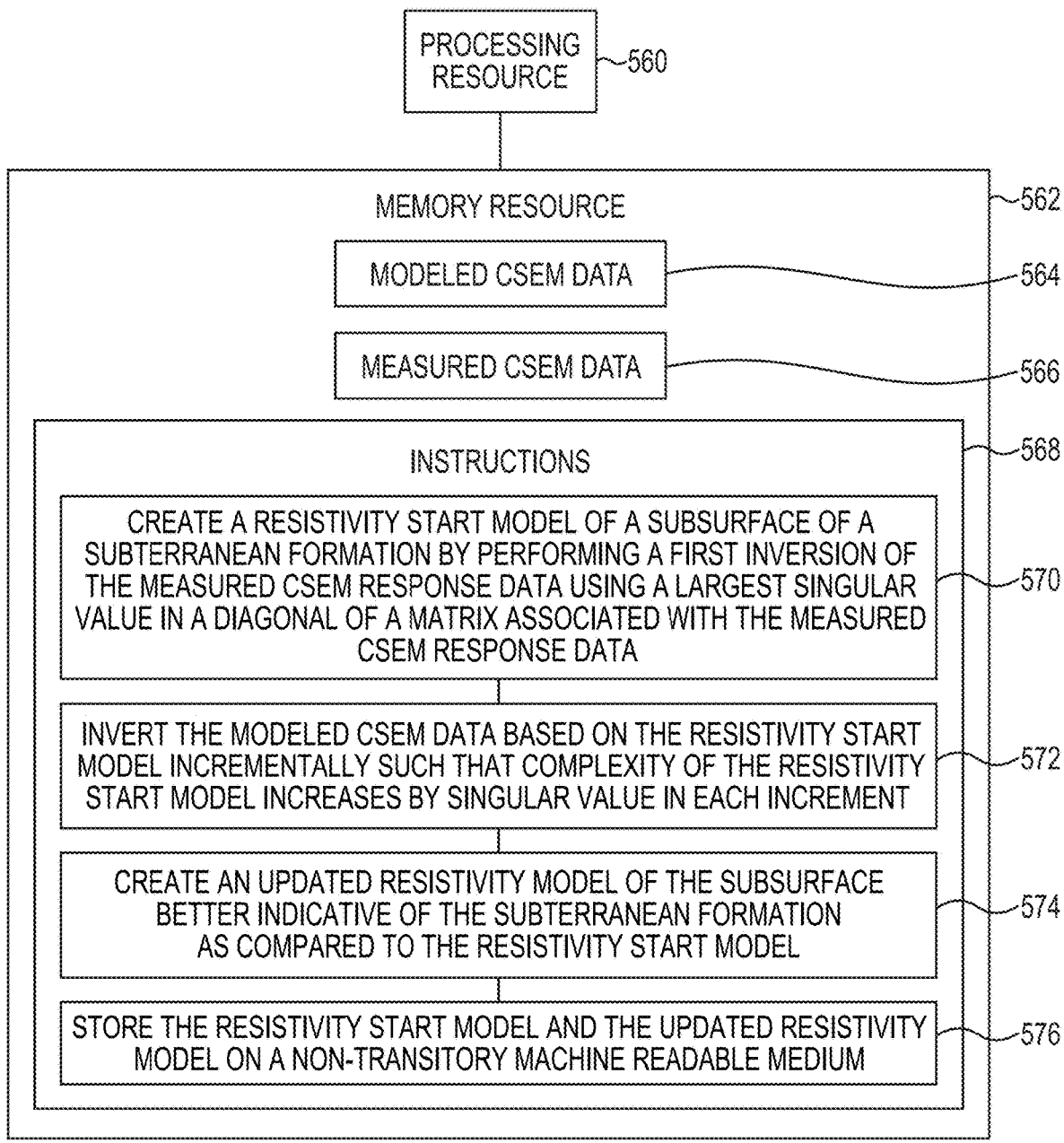
FIG. 5 illustrates a diagram of an exemplary system for EM response data inversion using SVD.

FIG. 5 illustrates a diagram of an exemplary system for EM response data inversion using SVD. The EM response data is CSEM response data in at least one embodiment. In at least one embodiment, the system can be analogous to or implemented by the controller 128 illustrated in FIG. 1. The system can utilize software, hardware, firmware, and/or logic to perform a number of functions. The system can be a combination of hardware and executable instructions configured to perform a number of functions (e.g., actions). The hardware, for example, can include a processing resource 560, such as at least one processor, and a memory resource 562, such as a machine-readable medium or other non-transitory memory resource 562. The memory resource 562 can be internal and/or external to the system. For example, the system can include an internal memory resource and have access to an external memory resource. The executable instructions 562 can be stored on the machine-readable medium in a machine-readable format and executable to implement a particular function. For example, the executable instructions 568 can be executed by the processing resource 560. The memory resource 562 can be coupled to the system in a wired and/or wireless manner. For example, the memory resource 562 can be an internal memory, a portable memory, a portable disk, and/or a memory associated with another resource, for example, enabling the executable instructions 562 to be transferred and/or executed across a network such as the Internet. In at least one embodiment, the memory resource 562 can be a plurality of non-transitory machine-readable media.

The memory resource 562 can be non-transitory and can include volatile and/or non-volatile memory. Volatile memory can include memory that depends upon power to store information, such as various types of dynamic random-access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid-state drive, etc., as well as other types of non-transitory machine-readable media.

The processing resource 560 can be coupled to the memory resource 562 via a communication path. The communication path can be local or remote to system. Examples of a local communication path can include an electronic bus internal to a machine, where the memory resource 562 is in communication with the processing resource 560 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path can be such that the memory resource 562 is remote from the processing resource 560, such as in a network connection between the memory resource 562 and the processing resource 560. That is, the communication path can be a network connection. Examples of such a network connection can include a local area network, wide area network, personal area network, and the Internet, among others.

The memory resource 562 can store modeled CSEM response data 564 and measured CSEM response data 566. The modeled CSEM response data 564 can be obtained from modeling or from a third party that conducted the modeling. The measured CSEM response data 566 can be obtained from a marine survey or from a third party that conducted the marine survey. The executable instructions 568 stored in the memory resource 562 can be segmented into a number of modules 570, 572, 574, and 576 that when executed by the processing resource 560 can perform a number of functions. As used herein, a module includes a set of instructions included to perform a particular task or action. The number of modules 570, 572, 574, and 576 can be sub-modules of other modules. For example, the module 570 can be a sub-module of the module 572 and/or the module 570 and the module 572 can be contained within a single module. Furthermore, the number of modules 570, 572, 574, and 576 can comprise individual modules separate and distinct from one another. Examples are not limited to the specific modules 570, 572, 574, and 576 illustrated in FIG. 5.

Module 570 can include instructions executable by the processing resource 560 to create a resistivity start model of a subsurface of a subterranean formation by performing a first inversion of the measured CSEM response data using a largest singular value in a diagonal of a matrix associated with the measured CSEM response data. For instance, by retaining just the largest singular value and setting the remaining diagonal elements to zero, the matrix is an approximation of the background response and can be attributed to the smoothest representation of the subsurface.

Module 572 can include instructions executable by the processing resource 560 to invert the modeled CSEM response data based on the resistivity start model incrementally such that complexity of the resistivity start model increases by a singular value in each increment. For example, the contribution from the subsequent singular values increases the complexity in a resulting response. Module 574 can include instructions executable by the processing resource 560 to create an updated resistivity model of the subsurface better indicative of the subterranean formation as compared to the resistivity start model. For instance, using the results of the inversions with increasing complexity, a more accurate (and updated) resistivity model can be created. A more accurate resistivity model includes more accurate resistivity zones, for example. Module 576 can include instructions executable by the processing resource 560 to store the resistivity start model and the updated resistivity model on a non-transitory machine-readable medium. The storage can occur onshore or offshore.

Though not illustrated in FIG. 5, a module can include instructions executable by the processing resource 560 to decompose the measured CSEM response data using truncated SVD. For instance, the inversion can include using truncated SVD to decompose the measured CSEM response data into different components with varying spatial resolution.

Although not specifically illustrated as such, the instructions 568 can be implemented by a number of engines that can be in communication with the memory resource 562 and the data stored therein (e.g., via a communication link). As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, etc. The number of engines can include a combination of hardware and program instructions that is configured to perform a number of functions described herein. The program instructions, such as software, firmware, etc., can be stored in a memory resource such as a machine-readable medium or as a hard-wired program such as logic. Hard-wired program instructions can be considered as both program instructions and hardware.

Figure 6A:
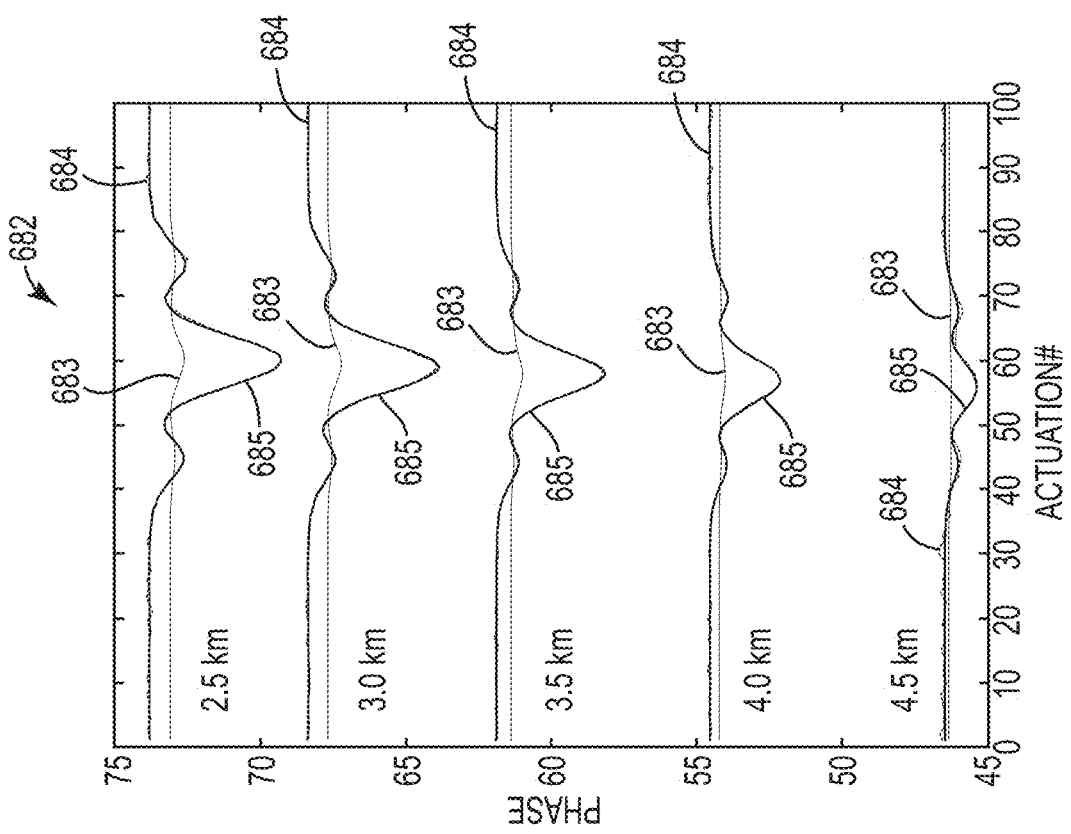
FIG. 6A illustrates an exemplary amplitude response diagram.

FIG. 6A illustrates an exemplary amplitude response diagram 680. For instance, diagram 680 is an amplitude response at 0.1 Hz for line number 50 in FIGS. 3A-3C. Offsets ranging from 2.5 km to 4.5 km are illustrated. The anomaly from the target is present from actuations 50 to 70. The amplitude response illustrated in FIG. 6A drops the background level for the same actuation range. Thin solid line 683 represents a background response approximated using the largest singular value only. For instance, this is CSEM response data that has been decomposed using truncated SVD considering the largest singular value. Dashed line 684 represents a truncated SVD response using two largest singular values, which reduces associated jitter as noise is suppressed. Thick solid line 685 represents measured or modeled CSEM response data with noise.

Figure 6B:
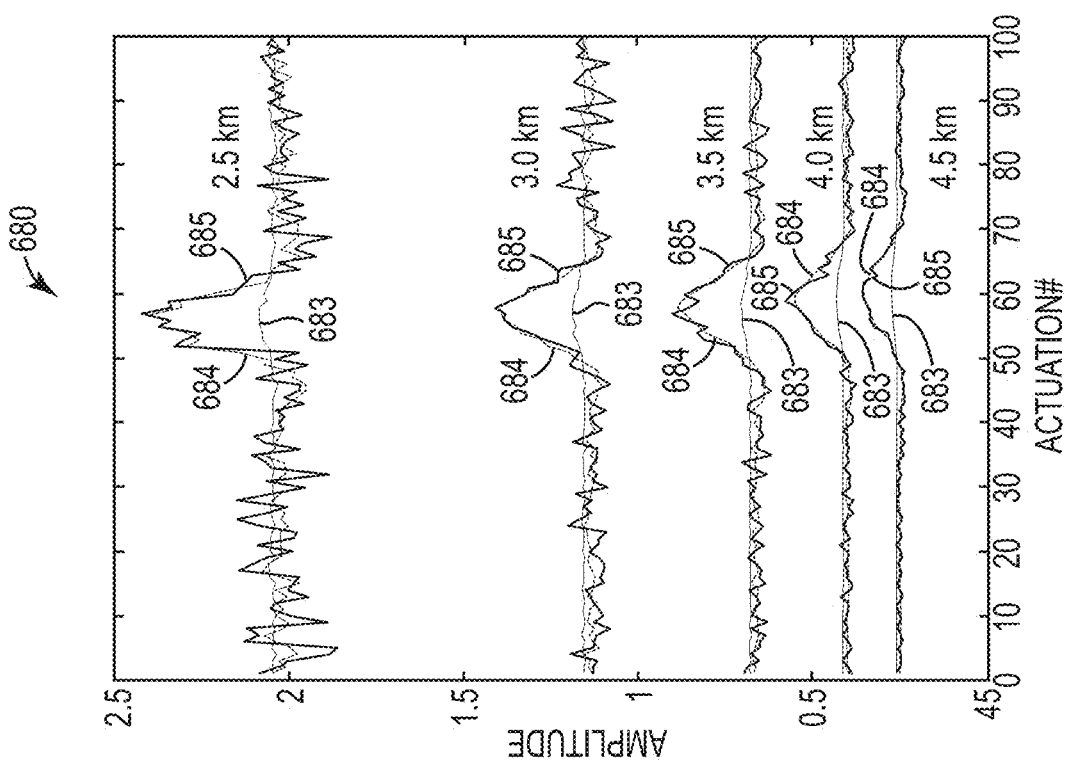
FIG. 6B illustrates an exemplary phase response diagram.

FIG. 6B illustrates an exemplary phase response diagram 682. For instance, diagram 682 is a phase response at 0.1 Hz for line number 50 in FIGS. 3A-3C. Offsets ranging from 2.5 km to 4.5 km are illustrated. The anomaly from the target is present from actuations 50 to 70. The phase response illustrated in FIG. 6A drops the background level for the same actuation range. Thin solid line 683 represents a background response approximated using the largest singular value only. For instance, this is CSEM response data that has been decomposed using truncated SVD considering the largest singular value. Dashed line 684 (mostly hidden behind thick solid line 685) represents a truncated SVD response using two largest singular values, which reduces associated jitter as noise is suppressed. Thick solid line 685 represents measured or modeled CSEM response data with noise.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. In a computer-implemented process for generating a resistivity map corresponding to geological features located beneath the surface of the earth (the "subsurface"), wherein the process is of the kind that applies inversion to measured, controlled-source electromagnetic ("CSEM") response data to produce a resistivity model of the subsurface, and wherein the measured CSEM response data corresponds to measurements made by one or more electromagnetic receivers during a marine CSEM survey, the specific improvement of performing computer-implemented steps comprising:
   generating, based on the measured CSEM response data, initial approximated response data corresponding to an initial level of complexity that is lower than that of the measured CSEM response data;
   performing an initial inversion that uses as inputs the initial approximated response data and an initial resistivity start model and produces, as an output, an initial resistivity output model corresponding to the geological features; and
   performing one or more subsequent inversions, wherein each of the subsequent inversions follows a previous inversion that produces a previous resistivity output model, and wherein performing each of the subsequent inversions comprises: (a) generating, based on the measured CSEM response data, subsequent approximated response data corresponding to a higher level of complexity than that of approximated response data used in the previous inversion; and (b) performing the subsequent inversion such that it uses as inputs the subsequent approximated response data and the previous resistivity output model and produces, as an output, a subsequent resistivity output model;
   thereby improving the robustness of the process for generating the resistivity map and, correspondingly, the accuracy of the subsequent resistivity output model.

2. A process according to claim 1:
   further comprising representing the measured CSEM response data with a data structure that corresponds to a matrix; and
   wherein generating the initial approximated response data comprises generating an initial approximation of the matrix.

3. A process according to claim 2, wherein:
generating the initial approximation of the matrix comprises generating a reduced-rank approximation of the matrix.

4. A process according to claim 3, wherein:
generating the reduced-rank approximation of the matrix comprises generating a singular value decomposition UΣV* of the matrix, wherein all but the largest k singular values of the matrix are set to zero in Σ, and wherein k is less than the rank of the matrix.

5. A process according to claim 4, wherein k is equal to 1.

6. A process according to claim 4, wherein:
generating the subsequent approximated response data comprises generating a singular value decomposition UΣV* of the matrix wherein all but the largest n singular values of the matrix are set to zero in Σ, and wherein n is greater than k.

7. A process according to claim 6, wherein, for each subsequent inversion:
when generating the subsequent approximated response data, the number of non-zero singular values in Σ is one greater than the number of non-zero singular values used to generate approximated response data for the previous inversion.

8. One or more tangible, non-volatile, computer-readable media having instructions stored therein that, when executed on one or more computing devices, cause the computing devices to perform a process for generating a resistivity map that corresponds to geological features located beneath the surface of the earth, wherein the process comprises:
accessing measured, controlled-source electromagnetic ("C SEM") response data, wherein the measured CSEM response data corresponds to measurements made by one or more electromagnetic receivers during a marine CSEM survey;
generating, based on the measured CSEM response data, initial approximated response data corresponding to an initial level of complexity that is lower than that of the measured CSEM response data;
performing an initial inversion that uses as inputs the initial approximated response data and an initial resistivity start model and produces, as an output, an initial resistivity output model corresponding to the geological features; and
performing one or more subsequent inversions, wherein each of the subsequent inversions follows a previous inversion that produces a previous resistivity output model, and wherein performing each of the subsequent inversions comprises: (a) generating, based on the measured CSEM response data, subsequent approximated response data corresponding to a higher level of complexity than that of approximated response data used in the previous inversion; and (b) performing the subsequent inversion such that it uses as inputs the subsequent approximated response data and the previous resistivity output model and produces, as an output, a subsequent resistivity output model.

9. Media according to claim 8:
further comprising representing the measured CSEM response data with a data structure that corresponds to a matrix; and
wherein generating the initial approximated response data comprises generating an initial approximation of the matrix.

10. Media according to claim 9, wherein:
generating the initial approximation of the matrix comprises generating a reduced-rank approximation of the matrix.

11. Media according to claim 10, wherein:
generating the reduced-rank approximation of the matrix comprises generating a singular value decomposition UΣV* of the matrix, wherein all but the largest k singular values of the matrix are set to zero in Σ, and wherein k is less than the rank of the matrix.

12. Media according to claim 11, wherein k is equal to 1.

13. Media according to claim 11, wherein:
generating the subsequent approximated response data comprises generating a singular value decomposition UΣV* of the matrix wherein all but the largest n singular values of the matrix are set to zero in Σ, and wherein n is greater than k.

14. Media according to claim 13, wherein, for each subsequent inversion:
when generating the subsequent approximated response data, the number of non-zero singular values in Σ is one greater than the number of non-zero singular values used to generate approximated response data for the previous inversion.

15. A method of manufacturing a geophysical data product containing resistivity indications corresponding to geological features located beneath the surface of the earth, by performing a computer-implemented process that comprises:
accessing measured, controlled-source electromagnetic ("C SEM") response data, wherein the measured CSEM response data corresponds to measurements made by one or more electromagnetic receivers during a marine CSEM survey;
generating, based on the measured CSEM response data, initial approximated response data corresponding to an initial level of complexity that is lower than that of the measured CSEM response data;
performing an initial inversion that uses as inputs the initial approximated response data and an initial resistivity start model and produces, as an output, an initial resistivity output model corresponding to the geological features; and
performing one or more subsequent inversions, wherein each of the subsequent inversions follows a previous inversion that produces a previous resistivity output model, and wherein performing each of the subsequent inversions comprises: (a) generating, based on the measured CSEM response data, subsequent approximated response data corresponding to a higher level of complexity than that of approximated response data used in the previous inversion; and (b) performing the subsequent inversion such that it uses as inputs the subsequent approximated response data and the previous resistivity output model and produces, as an output, a subsequent resistivity output model; and
storing the subsequent resistivity output model in one or more tangible, non-volatile, computer-readable media, thereby completing the manufacture of the geophysical data product.

16. A method according to claim 15:
further comprising representing the measured CSEM response data with a data structure that corresponds to a matrix; and
wherein generating the initial approximated response data comprises generating an initial approximation of the matrix.

17. A method according to claim 16, wherein:
generating the initial approximation of the matrix comprises generating a reduced-rank approximation of the matrix.

18. A method according to claim 17, wherein:
generating the reduced-rank approximation of the matrix comprises generating a singular value decomposition $U\Sigma V^*$ of the matrix, wherein all but the largest k singular values of the matrix are set to zero in $\Sigma$, and wherein k is less than the rank of the matrix.

19. A method according to claim 18, wherein k is equal to 1.

20. A method according to claim 18, wherein:
generating the subsequent approximated response data comprises generating a singular value decomposition $U\Sigma V^*$ of the matrix wherein all but the largest n singular values of the matrix are set to zero in $\Sigma$, and wherein n is greater than k.

21. A method according to claim 20, wherein, for each subsequent inversion:
when generating the subsequent approximated response data, the number of non-zero singular values in $\Sigma$ is one greater than the number of non-zero singular values used to generate approximated response data for the previous inversion.

\* \* \* \* \*